(12) United States Patent
Mellick et al.

(10) Patent No.: US 11,571,955 B2
(45) Date of Patent: *Feb. 7, 2023

(54) VEHICLE COVER AND INTEGRATED SECURITY SYSTEM

(71) Applicant: SinchTech Covers, LLC, Hayden, ID (US)

(72) Inventors: David Allen Mellick, Hayden, ID (US); Patrick Michael Molvik, Newport, WA (US); Robert Dean Bittick, Hayden, ID (US); Lisa Marie Daniels, Hayden, ID (US)

(73) Assignee: SINCHTECH COVERS, LLC, Hayden, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,916

(22) Filed: Mar. 9, 2021

(65) Prior Publication Data

US 2021/0188065 A1 Jun. 24, 2021

Related U.S. Application Data (63) Continuation of application No. 17/001,923, filed on Aug. 25, 2020, now Pat. No. 10,967,719.
(Continued)

(51) Int. Cl.
*B60J 11/04* (2006.01)
*B60R 25/102* (2013.01)
(Continued)

(52) U.S. Cl.
CPC .......... *B60J 11/04* (2013.01); *B60R 25/1001* (2013.01); *B60R 25/102* (2013.01);
(Continued)

(58) Field of Classification Search
CPC .... B60J 11/04; B60R 25/1001; B60R 25/102; B60R 25/302; B60R 25/305; B60R 2025/1016
See application file for complete search history.

(56) References Cited

U.S. PATENT DOCUMENTS

| | | |
|---|---|---|
| 2,801,667 A | 8/1957 | Curran |
| 4,222,032 A | 9/1980 | Speer |

(Continued)

FOREIGN PATENT DOCUMENTS

| | | |
|---|---|---|
| CN | 2454176 Y | 10/2001 |
| CN | 101071889 A | 11/2007 |

(Continued)

OTHER PUBLICATIONS

International Search Report and Written Opinion in related PCT Application No. PCT/US2022/034707 dated Jul. 27, 2022.

*Primary Examiner* — Nay Tun
(74) *Attorney, Agent, or Firm* — Troutman Pepper Hamilton Sanders LLP; John A. Morrissett; Aaron E. Johnston (57) ABSTRACT

A system includes a vehicle cover, a mechanical tensioning device, a memory device, storing instructions, and one or more processors configured to execute instructions to perform the steps of a method to secure a vehicle. The mechanical tensioning device may include attachment means to attach the device to a wheel of the vehicle and means to attach a security cable of the vehicle cover integrated into a bottom edge of the vehicle cover to the mechanical tensioning device. The mechanical tensioning device may include a rotational reel connected to either a tensioning motor or a tensioning crank and optionally including either a mechanical bi-stable device or one or more sensors configured to monitor the tension of the security cable when engaged to
(Continued)

the mechanical tensioning device. The processor may monitor for a change in tension and execute one or more security measures in response.

20 Claims, 8 Drawing Sheets

Related U.S. Application Data (60) Provisional application No. 62/970,805, filed on Feb. 6, 2020, provisional application No. 62/933,623, filed on Nov. 11, 2019.

(51) Int. Cl.
  *B60R 25/30* (2013.01)
  *B60R 25/10* (2013.01)

(52) U.S. Cl.
  CPC .......... *B60R 25/302* (2013.01); *B60R 25/305* (2013.01); *B60R 2025/1016* (2013.01)

(56) References Cited

U.S. PATENT DOCUMENTS

| | | |
|---|---|---|
| 4,355,839 A | 10/1982 | Rosen |
| 4,725,398 A * | 2/1988 | Ruckey ................. G21C 19/32 |
| | | 976/DIG. 258 |
| 4,763,783 A | 8/1988 | Talbot |
| 4,794,368 A | 12/1988 | Grossheim |
| 4,834,446 A | 5/1989 | Tung-chow |
| 5,343,915 A | 9/1994 | Newsome |
| 5,497,819 A | 3/1996 | Chiang |
| 5,813,360 A | 9/1998 | Dickey, Jr. |
| 5,902,003 A | 5/1999 | Hindson |
| 6,220,648 B1 | 4/2001 | Daniel |
| 6,485,086 B2 | 11/2002 | McGrath |
| 6,907,712 B2 | 6/2005 | Garfinkle |
| 7,455,257 B1 * | 11/2008 | Kaleta .................... B63C 11/02 |
| | | 242/397.3 |
| 7,900,670 B2 | 3/2011 | McCauley et al. |
| 8,910,997 B2 | 12/2014 | Featherman et al. |
| 9,399,089 B2 | 5/2016 | So |
| 10,766,345 B2 | 9/2020 | Ching |
| 2009/0095392 A1 | 4/2009 | Arrigoni Neri et al. |
| 2011/0123304 A1* | 5/2011 | Thomas .................. B60P 3/122 |
| | | 254/323 |
| 2019/0016565 A1 | 1/2019 | Hillgardner |

FOREIGN PATENT DOCUMENTS

| | | |
|---|---|---|
| KR | 101098773 B1 | 12/2011 |
| WO | WO-2007112530 A1 * | 10/2007 ............. A44C 5/208 |

* cited by examiner

VEHICLE COVER AND INTEGRATED SECURITY SYSTEM

CROSS REFERENCE TO RELATED APPLICATIONS

This application is a continuation of, and claims priority under 35 U.S.C. § 120 to, U.S. patent application Ser. No. 17/001,923, now U.S. Pat. No. 10,967,719, filed Aug. 25, 2020, which claims priority to U.S. Provisional Patent Application No. 62/970,805, filed Feb. 6, 2020, and U.S. Provisional Patent Application No. 62/933,623, filed Nov. 11, 2019, the entire contents of each of which are fully incorporated herein by reference.

FIELD OF THE INVENTION

The present disclosure relates to an integrated vehicle cover and security system, and more particularly a vehicle cover having a reinforced material and a mechanical tensioning device configured to secure the vehicle cover and provide increased security from potential theft and protection against the natural elements.

BACKGROUND

Vehicle covers are known to be an effective solution for protecting a vehicle from the elements. However, traditional vehicle covers are ineffective at preventing unauthorized tampering with a vehicle because vehicle covers provide little to no security from unwanted access to the vehicle.

The present invention is aimed at improving the security that is provided by traditional vehicle covers with a reinforced vehicle cover that is fastened by a tensioning device that securely fastens to the vehicle and secures the vehicle cover to the vehicle. Embodiments of the present disclosure are directed to this and other considerations.

SUMMARY

Disclosed embodiments provide an integrated vehicle cover and security system for securely fastening a tamper-resistant vehicle cover to a vehicle with a mechanical tensioning device. The vehicle cover may be made of a reinforced material, such as Kevlar or a similar material, or may include fibers reinforced with metal. The vehicle cover may additionally include a security cable made of cut and tamper-resistant material that is woven into a bottom edge of the vehicle cover. When placed over a vehicle, the bottom edge of the cover and security cable may surround a body of the vehicle with both ends of the security cable affixed to a mechanical tensioning device. When the mechanical tensioning device tensions the security cable, it securely fastens the cover to the vehicle to provide protection from the natural elements and a tamper-resistant layer of protection to prevent unwanted tampering with the vehicle. The mechanical tensioning device may include a plurality of wheel attachment arms to securely fasten the device to a wheel of the vehicle, although other attachments means that securely and conveniently fasten the mechanical tensioning device to a vehicle are contemplated. The mechanical tensioning device may additionally have cable attachment points for quickly receiving and fastening the first and second ends of the security cable to the device. Further, the mechanical tensioning device may include at least one rotational reel assembly onto which the device may wind the respective ends of the security cable to tension the vehicle cover securely to the vehicle.

In some embodiments, the mechanical tensioning device may be coupled to one or more tensioning motors configured to apply tension to the security cable and wind the first and second ends of the security cable at least partly into the at least one rotational reel assembly. The mechanical tensioning device may also include a load sensor that may monitor the tension being applied to the security cable. The mechanical tensioning device may additionally include a vibration sensor that may detect excessive shaking indicative of tampering with the mechanical tensioning device. The mechanical tensioning device may additionally include one or more processors and memory in communication with the processors configured to cause the integrated security system to perform one or more steps of a method. For example, the processor(s) and memory may enable Internet of Things (IoT) technology to be incorporated into the device to provide remote control, monitoring, and/or alarm functionality for the integrated vehicle cover and security system.

In some embodiments, the mechanical tensioning device may include the load and/or vibration sensors along with a manual tensioning crank for manual tensioning of the security cable of the vehicle cover to the mechanical tensioning device. The load sensor may provide an indication to the user of the vehicle cover when a predetermined tension has been placed on the security cable to securely affix the vehicle cover to the mechanical tensioning device. As described herein, the load sensor may monitor for a change in tension indicative of tampering with the integrated security system and/or the vibration sensor may monitor for tampering with the mechanical tensioning device. In response to detecting potential tampering, a processor and memory may enable IoT technology for providing remote control, monitoring, and/or alarm functionality for the integrated security system.

In another embodiment, a fully mechanical integrated vehicle cover and security system may include a reinforced vehicle cover having a security cable integrated into the bottom edge of the vehicle cover and configured to be fastened to a mechanical tensioning device. The mechanical tensioning device may be fastened to a wheel of the vehicle by one or more attachment arms, and the security cable may be wound into at least one rotational reel by applying rotational tension force to the mechanical tensioning device with the tensioning crank. When a predetermined tension is reached, a tactile indication may be provided to a user of the mechanical tensioning device. The tensioned device and vehicle security cover may provide improved protection from the natural elements and provide a tamper-resistant solution to dissuade potential tampering when a vehicle is left unattended.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figures 1A, 1B:
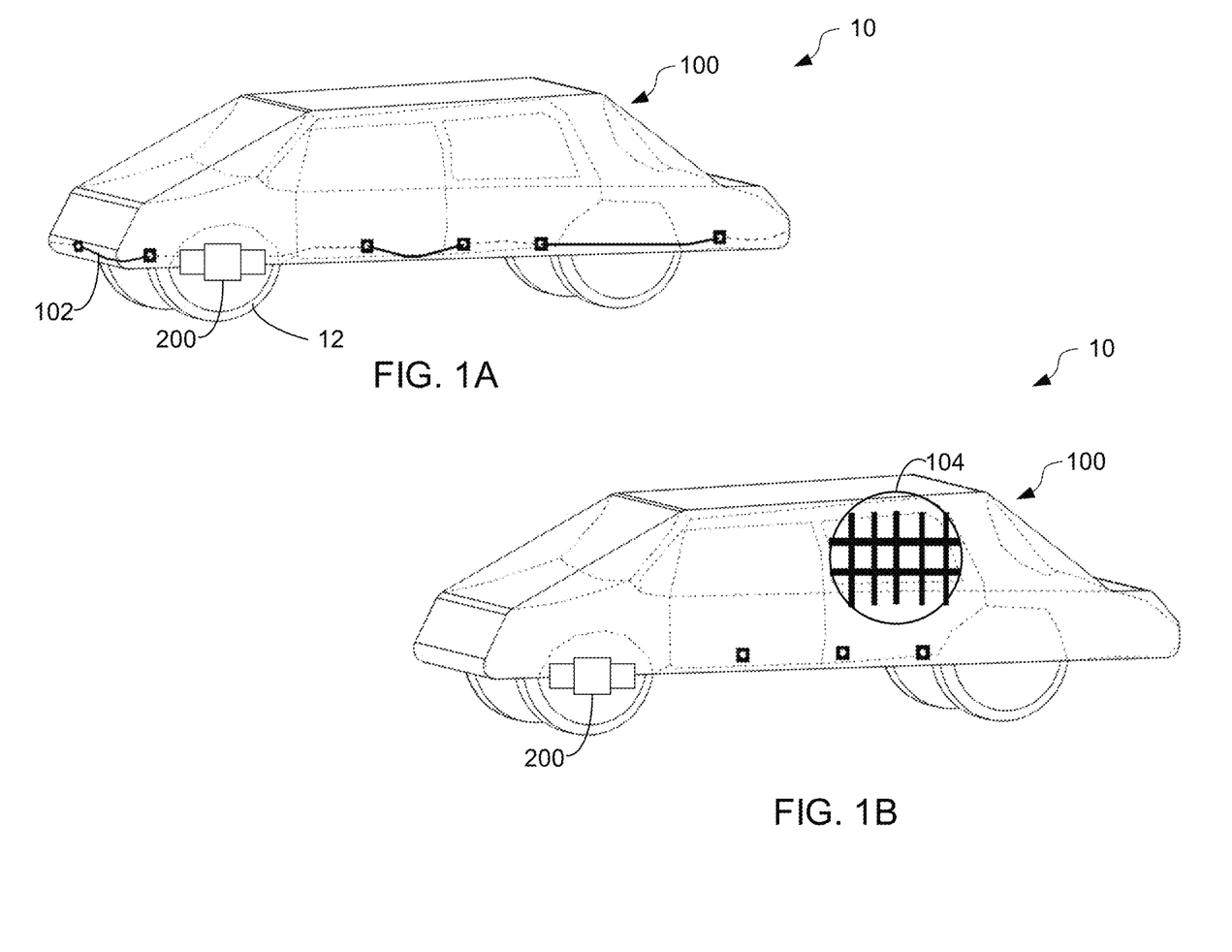
FIGS. 1A-1B show an example embodiments of a vehicle cover according to exemplary implementations of the disclosed technology.

FIGS. 1A-1B shows an example of a vehicle cover 100 according to exemplary implementations of the disclosed technology. The vehicle cover 100 may offer two main features that provide security enhancements over traditional vehicle covers. First, the vehicle cover 100 may be reinforced with tamper resistant materials, for example, Kevlar or other similar synthetic fibers that provide enhanced cut and tear resistance. In some embodiments, the material of the vehicle cover may include interwoven metal fibers to increase the tamper resistance of the material. Second, the vehicle cover 100 may integrate a security cable into its bottom edge such that, when the security cable is tightened, the bottom edge may be pulled tightly against a vehicle in a drawstring fashion.

As shown in FIG. 1A, the vehicle cover 100 may include a security cable 102 integrated into the bottom edge of the vehicle cover 100. The security cable 102 may include a convenient means of attachment to a mechanical tensioning device 200 to hold the vehicle cover 100 tightly against a vehicle 10 to provide protection from the natural elements and from potential theft and tampering. For example, the security cable 102 may be attached to the mechanical tensioning device 200 (e.g., at rotational reels or another connection point thereof) by clips, clamps, hooks, carabiners, or other fasteners/connectors, each of which may be selectively lockable and permanent or semi-permanent (i.e., not readily removeable without the use of tools or chemicals. Alternatively or additionally, the security cable 102 may loop around part of the mechanical tensioning device 200 (e.g., one or more of the rotational reels) and self-adhere mechanically (e.g., via a knot) and/or chemically to attach to the mechanical tensioning device 200. In other embodiments, the ends of the security cable 102 may be male-type "keys" or "pins" that mate with female-type lock housings on the mechanical tensioning device 200 to having to keep additional connectors that may be detached and lost over time. Alternatively, in further embodiments, the ends of the security cable 102 may be female-type lock housings configured to receive "keys" or "pins" that extend from the body of the mechanical tensioning device. In this manner, the jagged edges of the keys may be kept relatively stationary to avoid scratching the car as the ends of the security cable 102 are wrapped around the car. Regardless of the type of connector, the security cable 102 may include a first end with a first attachment means to couple to the mechanical tensioning device 200 and a second end with a second attachment means to couple to the mechanical tensioning device 200, as discussed in more detail with respect to FIGS. 3-4. FIG. 1B depicts a detailed view of a circular section of the vehicle cover 100 having reinforcement fibers 104, which may be interwoven into the fabric of vehicle cover 100. The reinforcement fibers 104 may include synthetic materials, such as Kevlar, or metallic based compounds for improving the cutting and tearing resistance of the given material. The vehicle cover 100 may be made of or include any light weight, tear resistant material and may have advantageous properties, such as being resistant to dust and water and providing a level of scratch resistance to the vehicle. These advantageous properties of the vehicle cover 100, which may be tailored to use with a particular vehicle or in a particular environment, may be achieved by combining layers of different materials (e.g., Kevlar fibers and/or metallic compounds), or in some embodiments, a homogenous fabric. Security cable 102 may include any elongated resilient element capable of withstanding tension and providing resistance to cutting and/or tearing.

Figure 2A:
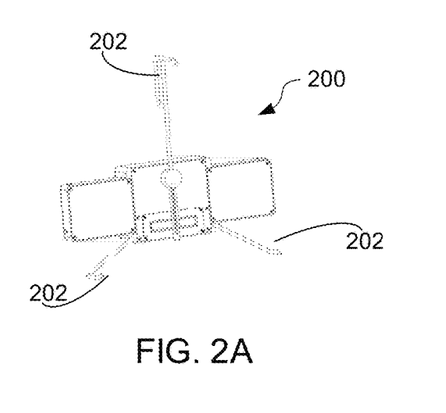
FIGS. 2A-2C depict example embodiments of a mechanical tensioning device according to exemplary implementations of the disclosed technology.

FIG. 2A is a rear perspective view of the mechanical tensioning device 200, according to an exemplary embodiment. As shown in FIG. 2A, the mechanical tensioning device 200 may include a plurality of attachment arms 202 for securely attaching the mechanical tensioning device 200 to a wheel of a vehicle. The mechanical tensioning device 200 may include a locking mechanism that prevents the removal of the mechanical tensioning device 200 from a wheel 12 of the vehicle 10 once the device has been securely attached in order to prevent tampering with the vehicle 10 or components of the vehicle cover 100 or mechanical tensioning device 200. In some embodiments, the mechanical tensioning device 200 may include a spring (not shown) placed on one or more of the plurality of attachment arms 202. The spring may provide a clamping force to help fasten the mechanical tensioning device 200 to the wheel 12. In some embodiments, the locking mechanism preventing removal of the mechanical tensioning 200 device may be provided by a combination of (i) the clamping force of the spring(s) of the attachment arm(s) 202 and (ii) tensioning of the security cable 102. As described in more detail with respect to FIG. 2C and FIG. 6, one or more sensors on the mechanical tensioning device 200 may be configured to detect any tampering with the mechanical tensioning device 200.

Figure 2B:
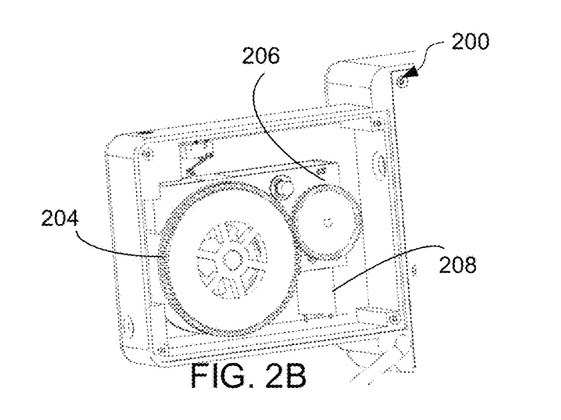

FIG. 2B is an interior rear view of a portion of the mechanical tensioning device 200. In some embodiments, the mechanical tensioning device 200 may include at least one rotational reel 204 which, when wound, is configured to reel in excess slack of one or both ends of the security cable 102 onto the respective rotational reel 204 until a predetermined tension is achieved to securely fasten the vehicle cover 100 to the vehicle 10 via mechanical tensioning device 200, which also securely fastens to the wheel of the vehicle. In some embodiments, the mechanical tensioning device 200 may only have a single rotational reel, while in other embodiments, dual rotational reels may be provided. In some embodiments, the rotational reel may be coupled to at least one tensioning motor 208. Numerous advantages may be provided by the use of a dual rotational reel. While a single rotational reel may be more cost effective to produce, a single rotational reel may suffer from increased friction when tensioning the security cable 102 from a single point. For example, the security cable 102 may provide increased friction against the vehicle 10, especially as the security cable 102 tightens around corners of the vehicle 10. However, using dual rotational reels enables the mechanical tensioning device 200 to apply tension from two directions (e.g., at a point of attachment for each of the rotational reels), thereby reducing friction of the security cable 102 and chances of damage to the vehicle 10 associated with the security cable 102 rubbing against the exterior of the vehicle 10.

Tensioning motor 208 can be any suitable electrical motor, including, for example, a 12 Volt DC 100-150 rpm motor. The tensioning motor 208 can be coupled to a driving gear 206 to provide rotational force to the at least one rotational reel 204. In some embodiments, the driving gear 206 may comprise a gearbox with a plurality of gears. The gears may be selected to provide the desired force from the tensioning motor 208 to tension the security cable 102 to a desired tension. In some embodiments, tensioning motor 208 may comprise a manual winding crank (not shown) coupled to the rotational reel 204 by a driving gear 206 to allow a user to apply mechanical tension to the rotational reel 204 by winding the crank. In embodiments including a tensioning crank, the tensioning crank may further include a mechanical device, such as a bi-stable mechanical device, that is configured to provide feedback to a user of the manual winding crank when the desired tension has been applied to the security cable 102. In such embodiments, the bi-stable mechanical device may be configured to provide a "clicking" (e.g., audible and/or tactile) feedback while the user of the mechanical tensioning device 200 winds the tensioning crank. When the appropriate tension has been applied, the bi-stable mechanical device may disengage the winding crank from applying torque to the security cable 102, for example, by disengaging a clutch from the tensioning crank when a predetermined tension is reached.

Figure 2C:
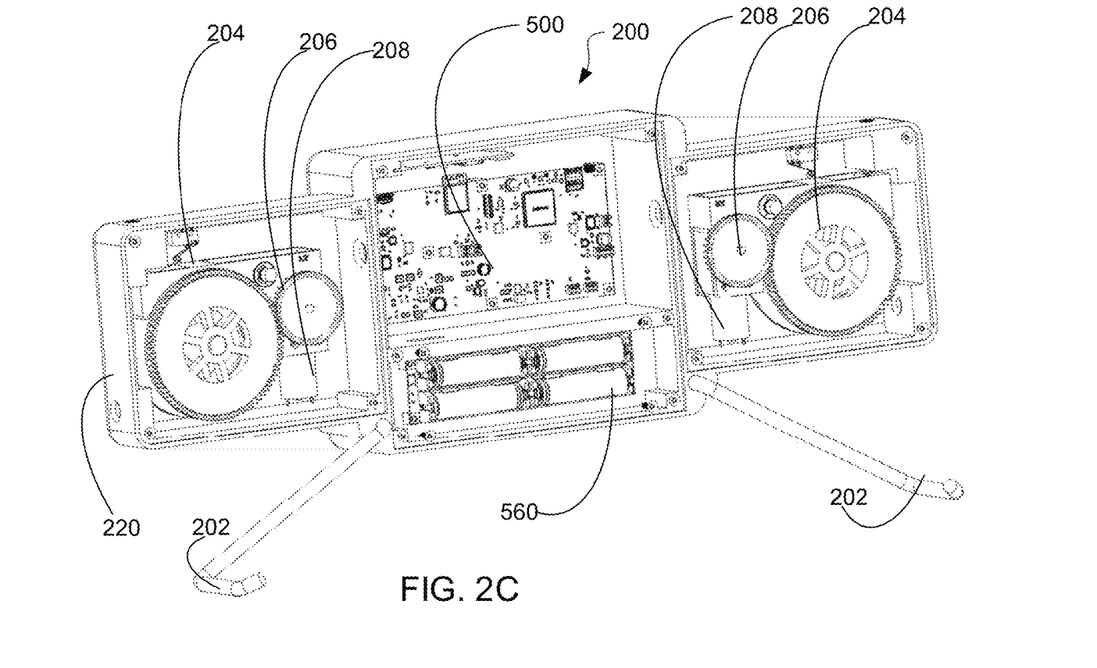

FIG. 2C is a rear interior view of a mechanical tensioning device 200, according to an exemplary embodiment. In this embodiment, the mechanical tensioning device 200 may include three attachment arms 202 for attaching the device to the wheel 12 of the vehicle 10. While it is contemplated that the mechanical tensioning device 200 may be attached to any wheel 12 of the vehicle 10, in some embodiments it may be configured to be attached to a wheel on the side of the vehicle opposite traffic should the vehicle pull off the road (e.g., generally on the passenger side in the US) to increase safety during installation. Additionally, the mechanical tensioning device 200 may include two rotational reels 204, and two corresponding tensioning motors 208 and driving gears 206. Additionally, in some embodiments, mechanical tensioning device 200 may include a computing device 500 and a power supply 560. In such embodiments, the computing device 500 may be configured to enable Internet of Things (IoT) technology to be incorporated into the mechanical tensioning device 200 to provide remote control, monitoring, and/or alarm functionality for the integrated vehicle cover 100 and security system. Computing device 500 is discussed in further detail with respect to FIG. 5 and the various functionalities enabled by computing device 500 are discussed in further detail with respect to FIGS. 6-8. In some embodiments, the mechanical tensioning device 200 may be fitted with one or more sensors. For example, mechanical tensioning device may include a load sensor (not shown) configured to monitor the tension placed on security cable 102. In response to detecting a change in tension, the load sensor 210 may be configured to transmit a signal to computing device 500 to enable one or more security actions (discussed in more detail with respect to FIGS. 6-8). In some embodiments, the load sensor may comprise a limit switch in communication with each rotational reel 204 of mechanical tensioning device 200. When tension is applied to the security cable 102, the rotational reel 204 may begin a rotational motion (e.g., as shown in more detail with respect to FIGS. 4A-4B). Opposing the tensioning force, the rotational reel 204 may include a spring and tension adjustment screw that may provide an opposing force to the tensioning of the security cable 102. When line tension is removed, the spring and tension adjustment screw may hold the rotational reel 204 in a neutral position until tension is applied to the security cable 102. When line tension is applied and the rotational reel 204 begins to pivot, the rotational reel 204 may make contact with the limit switch, indicating that a predetermined tension has been met. As long as tension remains in the security cable 102, the limit switch will remain engaged. If tension is removed from the security cable 102, the limit switch disengages and provides feedback to the mechanical tensioning device that tension has been lost. In some embodiments, the load sensor may comprise a traditional load cell which may continuously monitor the tension applied to the security cable 102. In some embodiments, mechanical tensioning device 200 additionally include one or more vibration sensors (not shown) for detecting vibration of the security cable 102 and/or mechanical tensioning device 200 to help detect and respond to potential tampering with the vehicle cover 100. The vibration sensor may be integrated with the main circuit board of the mechanical tensioning device 200 (e.g., as shown in more detail with respect to FIG. 2C) and may be capable of detecting excess vibration of the mechanical tensioning device 200. The vibration sensor(s) may be a three-axis accelerometer device. For example, the vibration sensor may be configured to detect certain acceleratory patterns, such as a rotation and/or free-fall motion. The vibration sensor may be configured to detect acceleration in any direction (e.g., an acceleration vertically up or down, side to side, forwards or backwards, or any combination thereof). Because the mechanical tensioning device 200 may be detachably connected to the wheel 12 of vehicle 10, smaller vibrations that are not indicative of tampering (e.g., vibrations caused by wind) may be filtered out such that only significant vibrations will cause the wheel 12 and/or the mechanical tensioning device 200 to vibrate sufficiently to be detected by the vibration sensor. In some embodiments, a sensitivity of the vibration sensor may be adjustable by the end-user (e.g., via computing device 500, as discussed in more detail with respect to FIGS. 5-6) and/or a third-party source (e.g., with feedback from other users, weather data, etc.) in order to minimize false positive tampering events.

Figure 3A:
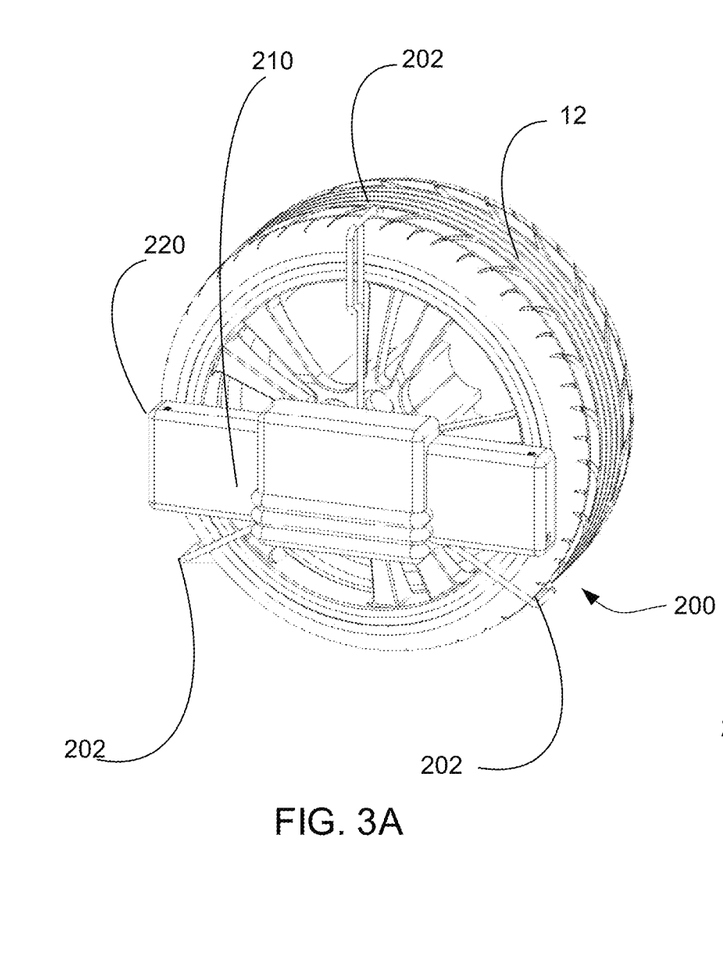
FIGS. 3A-3B depict example embodiments of the mechanical tensioning device mounted to a vehicle wheel according to exemplary implementations of the disclosed technology.

FIG. 3A is a front perspective view of mechanical tensioning device 200 attached to a vehicle wheel 12, according to an exemplary embodiment. As discussed with respect to FIGS. 2A-2C, mechanical tensioning device 200 may include a plurality of attachment arms 202 for securely attaching the device to a wheel of a vehicle. Additionally, the mechanical tensioning device may include a tamper proof housing 220 to securely house all the integrated components of the mechanical tensioning device 200 on the inside of the tamper proof housing 220. The tamper proof housing 220 may include a plurality of access screws allowing access to the internal components of the mechanical tensioning device 200 only when the mechanical tensioning device 200 is not securely attached to a vehicle 10. For example, when the mechanical tensioning device 200 is securely attached to the vehicle 10, the plurality of access screws may be inaccessible to a user of the mechanical tensioning device 200.

Figure 3B:
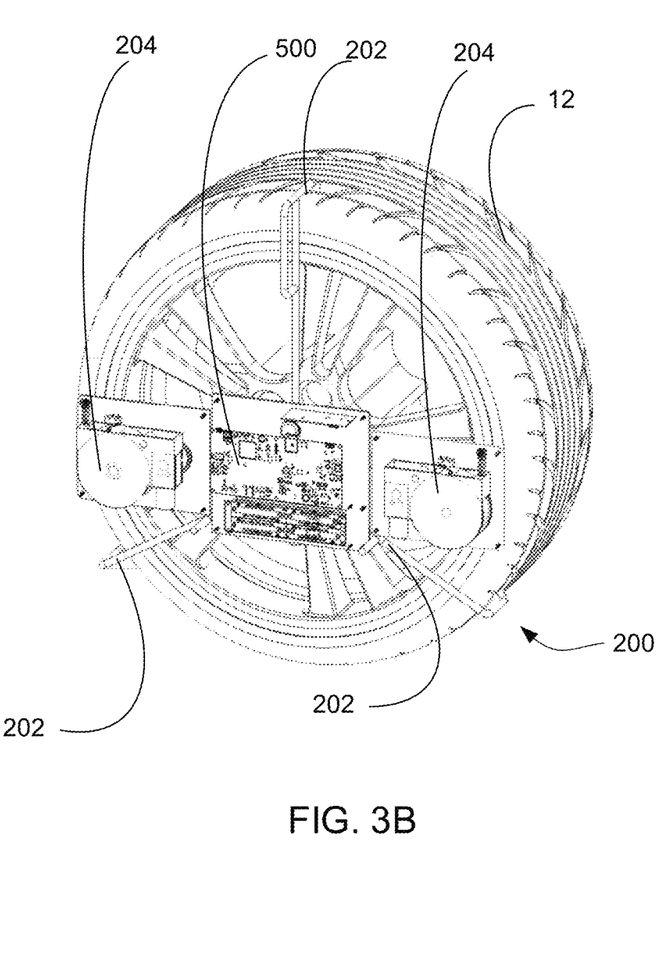

FIG. 3B is a front interview view of the mechanical tensioning device 200 attached to the vehicle wheel 12, according to an exemplary embodiment. As discussed previously, mechanical tensioning device 200 may include at least one rotational reel 204, at least one driving gear 206, and at least one tensioning motor 208. In some embodiments, computing device 500 is provided to enable IoT functionality of mechanical tensioning device 200. In some embodiments, the mechanical tensioning device 200 may be both electronically wound and monitored. In some embodiments, the mechanical tensioning device 200 may be manually wound and electronically monitored. Finally, in some embodiments, a fully manual mechanical tensioning device 200 is provided. Advantages of the fully electronic configuration of the mechanical tensioning device 200 may include increased ease of use for the end-user and improved security. For example, security may be improved because the mechanical tensioning device 200 is both electronically monitored and wound. Being a fully manual system may significantly reduce its price point with most of the added security of the fully electronic embodiment retained. Further, being a hybrid system (e.g., electronically monitored but mechanically wound) may advantageously decrease costs compared to the fully electronic embodiment, with the added benefit of providing most of the security features of the fully electronic configuration.

Figure 4A:
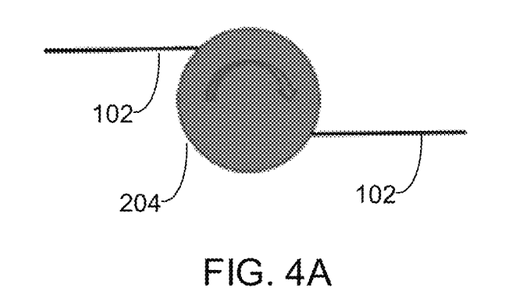
FIGS. 4A-4B depicts the tensioning of the security cable component of an exemplary vehicle cover into a single rotational reel and dual rotational reels, according to exemplary implementations of the disclosed technology.
Figure 4B:
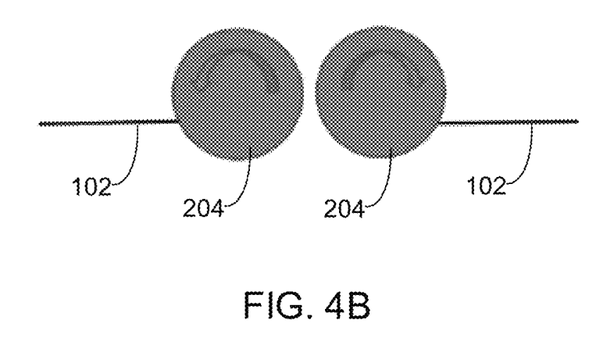

FIGS. 4A-4B depicts the tensioning of the security cable 102 of the vehicle cover 100 into a single rotational reel (FIG. 4A) and dual rotational reels (FIG. 4B), according to exemplary implementations of the disclosed technology. In FIG. 4A, a single rotational reel 204 is depicted. With a single rotational reel 204, the mechanical tensioning device 200 may receive first (e.g., left) and second (e.g., right) ends of the security cable 102, with the rotational reel 204 positioned in between the respective ends of the security cable 102. When the rotational reel 204 is spun by, for example, tensioning motor 208, the rotational reel 204 may rotate in the driving direction of tensioning motor 208 (e.g., clockwise or counterclockwise) and wind the respective first end and second end of security cable 102 around the rotational reel 204. Advantageously in certain situations, a single rotational reel may save valuable space and allow the mechanical tensioning device 200 to be physically smaller and more convenient to use and store for the end user when compared to the dual rotational reel embodiment.

Conversely, FIG. 4B depicts how dual rotational reels 204 may operate when coupled to a single shared tensioning motor 208. As shown in FIG. 4B, the longitudinal axis of the rotational reels 204 may be positioned substantially perpendicular to the longitudinal axis of the security cable 102. In this embodiment, the output of the tensioning motor 208 may be coupled rotational to at least one of rotational reels 204. The rotational reels 204 may be connected to security cable 102 in such a way to draw in the ends of the security cable 102 like a drawstring. The dual rotational reel embodiment may include several advantages over the single rotational reel embodiment. For example, a dual rotational reel may take in slack from the security cable 102 from two opposite directions simultaneously, decreasing the likelihood that the security cable 102 may be incorrectly tensioned such that a portion of the security cable 102 is tensioned more tightly than another portion of the security cable 102. This may occur with use of the single rotational reel embodiment as the security cable 102 may wrap around a front, rear, and sides of the vehicle 10, with each corner increasing the friction associated with tightening the security cable 102 to the predetermined tension. Accordingly, monitoring tension of the security cable 102 may be more difficult for the single rotational reel embodiment, because the dual rotational reel embodiment is associated with reduced friction on the security cable 102 when the mechanical tensioning device 200 is being attached to the vehicle 10.

Figure 5:
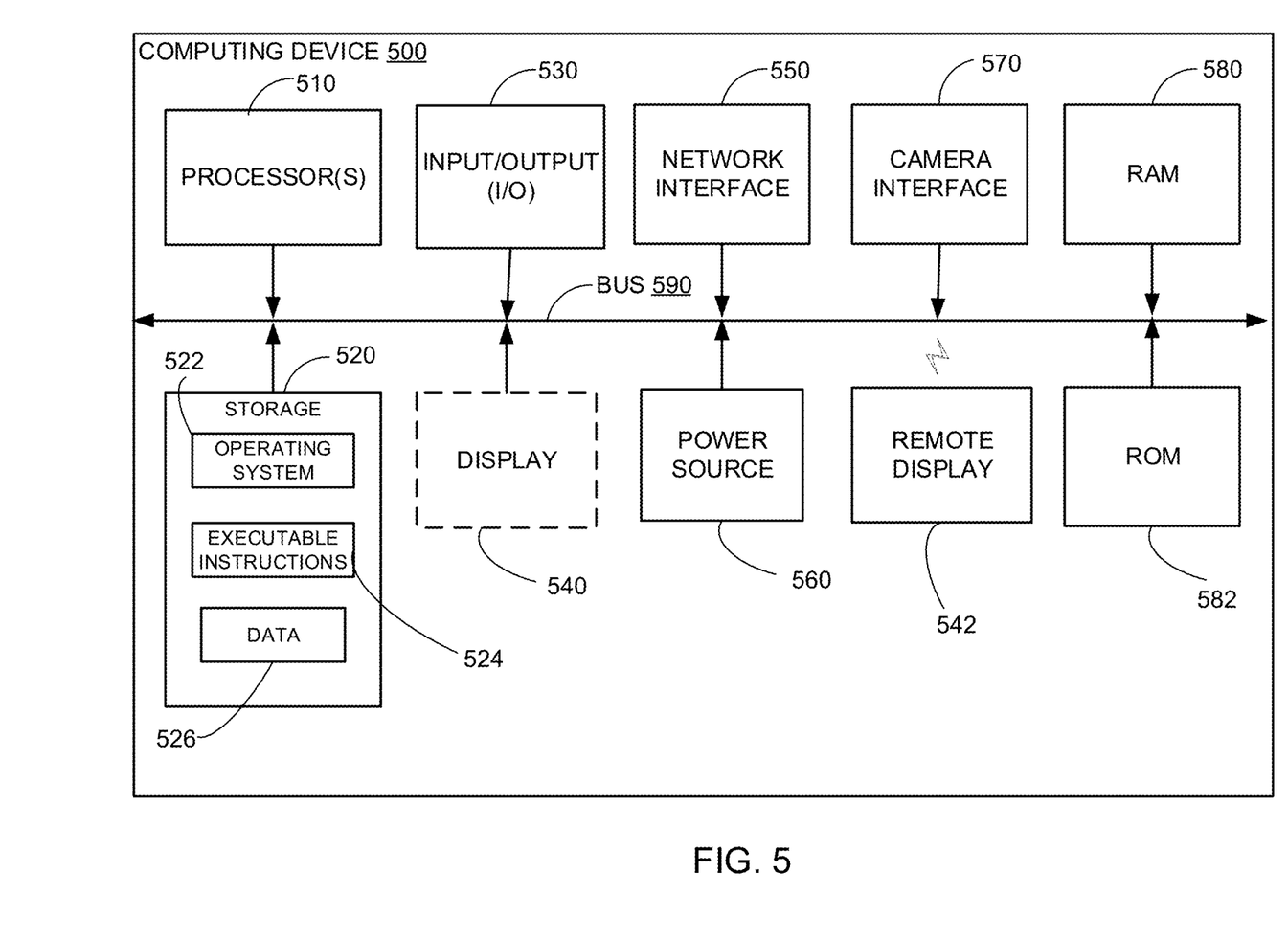
FIG. 5 depicts a computing system architecture according to an exemplary implementation of the disclosed technology.

FIG. 5 provides an architectural diagram of the computing device 500, and implementations of the disclosed technology may include the computing device 500 with more or fewer components than those shown. It will be understood that the example diagram of computing device 500 is provided for example purposes only and does not limit the scope of the various implementations of the present disclosed systems, methods, and computer-readable mediums. As shown, the computing device 500 may include a central processing unit (CPU) 510 for processing computer instructions and a display interface 540 that supports a graphical user interface and provides functions for rendering video, graphics, images, and texts on the display. In an example implementation, display interface 540 may be configured for providing data, images, and other information for an external/remote display that is not necessarily physically connected to the computing device 500 (e.g., by providing a remote graphical user interface to a user computing device via an application user interface over a network). In certain example implementations, display interface 540 wirelessly communicates, for example, via a Wi-Fi channel, Bluetooth connection, or other available network connection interface 550 to the external/remote display (e.g., remote display 542).

The network may be of any suitable type, including individual connections via the internet such as cellular or WiFi networks. In some embodiments, the network may connect the security system to external components using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

In an example implementation, network connection interface 550 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, another like communication interface, or any combination thereof.

Computing device 500 may include an input/output interface 530 that provides a communication interface to one or more components of mechanical tensioning device 200 and one or more user computing devices (e.g., in wireless communication with computing device 500 over a network). Computing device 500 may be configured to use one or more input components via one or more of input/output interfaces (for example, input/output interface 530, remote display interface 542, network connection interface 550, a camera interface 570, etc.) to allow computing device architecture 500 to present information to a user and capture information from the environment of the mechanical tensioning device 200 through information recorded by e.g., the camera integrated into mechanical tensioning device 200, load sensor, and/or vibration sensor. In some embodiments, user input 530 may be provided by an external component (e.g. a user computing device) via electronic communication over a wireless network.

In example implementations, network connection interface 550 may support a wireless communication interface to a network. As mentioned above, input/output interface 530 may be in communication with network connection interface 550, for example, to receive instructions from the user computing device via a network, thereby enabling communication with devices that are not directly connected or attached to the system. In certain implementations, camera interface 570 may be provided that acts as a communication interface and provides functions for capturing digital images from a camera optionally integrated into mechanical tensioning device 200 and providing this image, series of images, or video to the user computing device as part of a generated security measure. According to example implementations, a random-access memory (RAM) 580 may be provided, where computer instructions and data may be stored in a volatile memory device for processing by the processor(s) 510.

According to example implementations, computing device architecture 500 may include a read-only memory (ROM) 582 where invariant low-level system code or data for basic system functions such as basic input and output (I/O), startup, or reception of keystrokes from a keyboard may be stored in a non-volatile memory device. According to example implementations, computing device 500 may include a storage medium 520 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 522, application programs (including, for example, a web browser application, a widget or gadget engine, an application programming interface (API) to communicate with, for example, a user computing device, and or other applications, as necessary), executable instructions 524 (including stored programs that enable various operations of the method, and data files 526, which may include image files captured by the integrated camera of mechanical tensioning device 200. According to example implementations, computing device architecture 500 may include a power source 560 that may provide an appropriate alternating current (AC) or direct current (DC) to power components.

According to an example implementation, processor 510 may have appropriate structure to be a computer processor. In one arrangement, processor 510 may include more than one processing unit. RAM 580 may interface with a computer bus 290 to provide quick RAM storage to the processor 510 during the execution of software programs such as the operating system, application programs, and device drivers. More specifically, processor 510 may load computer-executable process steps from storage medium 520 or other media into a field of RAM 580 to execute software programs. Data may be stored in RAM 580, where computer processor 510 may access data during execution. In one example configuration, and as will be understood by one of skill in the art, computing device 500 may include sufficient RAM and flash memory for carrying out processes relating to the disclosed technology.

Storage medium 520 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to off-load data from the device or to upload data onto the device. A computer program product for enabling the security measures of the mechanical tensioning device 200 may be tangibly embodied in storage medium 520, which may include a non-transitory, machine-readable storage medium.

According to example implementations, the term "computing device," as used herein, may be a processor, or conceptualized as a processor (for example, processor 510 of FIG. 5). In such example implementations, the computing device (processor) may be coupled, connected, and/or in communication with one or more peripheral devices, such as mechanical tensioning device 200 and/or user computing device.

In example implementations of the disclosed technology, a computing device includes any number of hardware and/or software applications that are executed to facilitate any of the operations. In example implementations, one or more input/output interfaces 530 may facilitate communication between the computing device 500 and one or more devices, such as components of the mechanical tensioning device 200 (e.g., tensioning motor 208) and/or associated sensors (e.g., input from load sensor or vibration sensor). The one or more user input/output interfaces 530 may be utilized to receive or collect data and/or user instructions from a wide variety of input devices (e.g., user computing device and/or load sensor and/or vibration sensor). Received data may be processed by one or more computer processors 510 as desired in various implementations of the disclosed technology and/or stored in one or more memory devices, such as storage medium 520.

One or more network interfaces 550 may facilitate connection of the computing device inputs and outputs to one or more suitable networks and/or connections. For example, the connections that facilitate communication with any number of sensors associated with the system. The one or more network interfaces 550 may further facilitate connection to one or more suitable networks; for example, a local area network, a wide area network, the Internet, a Wi-Fi enabled network, a satellite-based network, any wired network, any wireless network, etc., for communication with external devices and/or systems. In some embodiments, mechanical tensioning device may be configured to receive and act on instructions from computing device 500.

Figure 6:
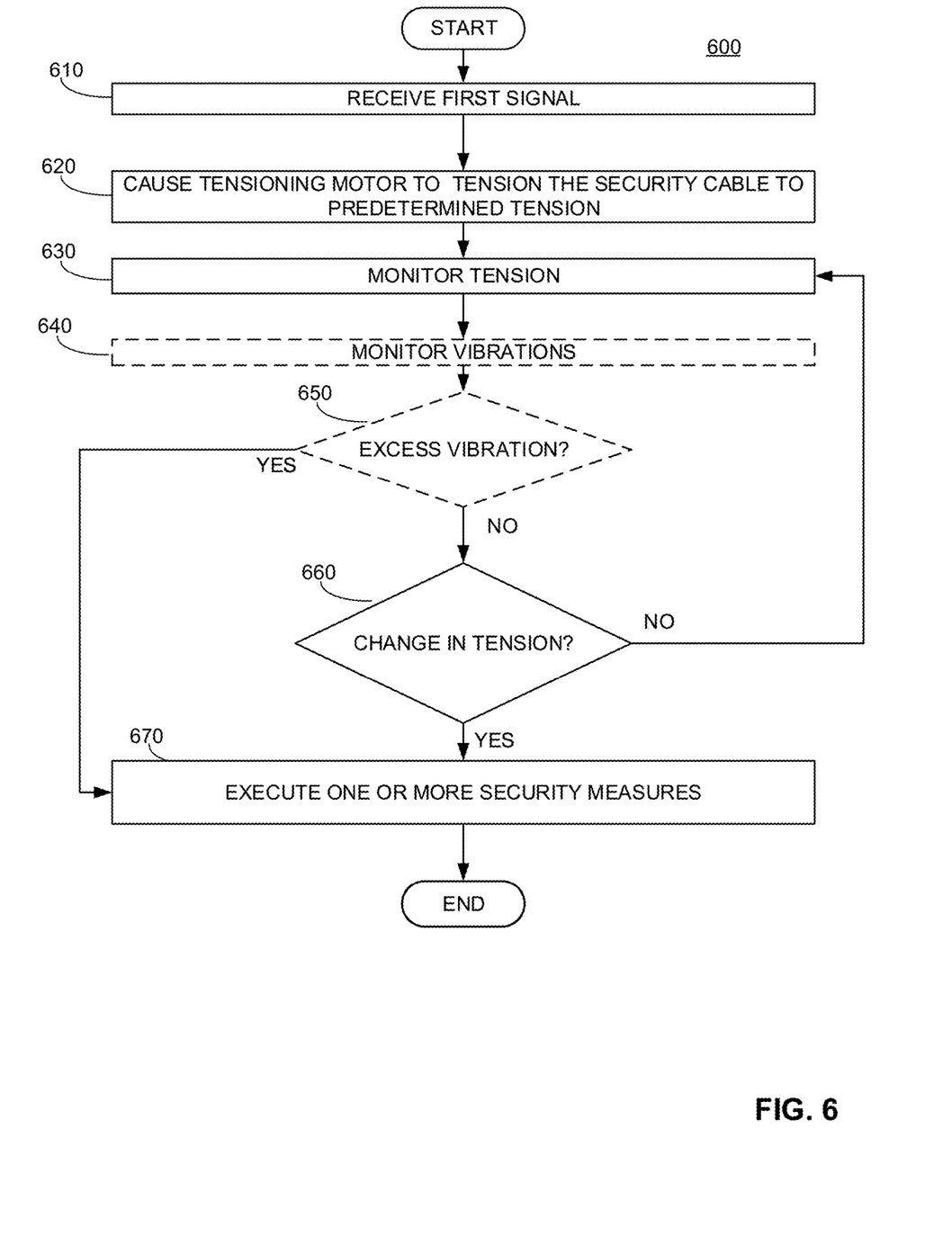
FIG. 6 is a flowchart for an exemplary method of operation of the integrated vehicle cover and security system.

FIG. 6 is a flowchart for an exemplary method of operation of an integrated vehicle cover and security system having one or more sensors and a computing device as described with respect to FIG. 5. In step 610, processor 510 may receive a first signal from a user computing device. For example, the user of the integrated vehicle cover and security system may place the vehicle cover 100 on his or her vehicle, and attach the first and second ends of security cable 102 to the mechanical tensioning device 200. The security cable 102 may be coupled to or housed within the bottom edge of the vehicle cover 100 and configured to be drawn in a drawstring fashion when engaged to the mechanical tensioning device 200. However, in some embodiments, the security cable 102 may be permanently or semi-permanently coupled to both the mechanical tensioning device 200 and the vehicle cover 100 such that no coupling is required before beginning use of the mechanical tensioning device 200. Once the vehicle cover 100 (and its security cable 102) and mechanical tensioning device 200 are coupled, the user may interact with computing device 500 (e.g., via a web application, API or mobile application on the user computing device, etc.) to control functionality of the integrated vehicle cover and security system. Instructions from the user computing device may be transmitted to one or more servers associated with computing device 500 via a network. Computing device 500, may receive a signal from the user computing device, via one or more backend servers and the network, with instructions to activate the tensioning motor 208 to engage and begin applying rotational force to the rotational reel 204 to wind the security cable 102 into the rotational reel 204 until security cable 102 reaches a predetermined tension as measured by the load sensor 210 in step 620. In some embodiments, an additional layer of security may be provided by a wireless key FOB paired with the mechanical tensioning device 200. The wireless key FOB may include a transponder encoded with a predetermined electronic key matching that of a corresponding mechanical tensioning device 200. Accordingly, the wireless key FOB may be configured to transmit "lock" and "unlock" instructions to the corresponding mechanical tensioning device 200. The key FOB may transmit the lock/unlock instructions to the mechanical tensioning device 200 via any electronic connection, but preferably using a transponder paired to a corresponding mechanical tensioning device 200. In some embodiments, a user computing device may be utilized to communicate with the mechanical tensioning device, preferably using low energy Bluetooth™ in order to reduce power consumption of the system. In some embodiments, WiFi™ or a similar wireless connection may be used in place of low energy Bluetooth (e.g., when the mechanical tensioning device is connected to a wireless home network). Accordingly, in some embodiments, computing device 500 may receive the signal from the wireless key FOB rather than from the user computing device in order to provide an additional layer of security to the implementation of the mechanical tensioning device 200. Additionally, in some embodiments, the wireless key FOB may be used to transmit a "wake" or "sleep" signal to the computing device 500, which may cause the computing device to enter an active state or an inactive state (e.g., to conserve battery power), respectively. The computing device 500 may be configured to only receive signals from a user computing device when the computing device 500 is put into an active state (e.g., by using the wireless key FOB to transmit a "wake" signal to the computing device 500).

In step 630, computing device 500 receives tension signals (e.g., from a load sensor) and monitors the tension placed on the security cable 102. The load sensor(s) may be in communication with computing device 500 (e.g., via I/O 530). Computing device 500 may be configured to respond to a change in tension as determined by the load sensor. In optional step 640, the computing device 500 may monitor vibrations (e.g., based on signals received from vibration sensor(s), as described in more detail with respect to FIG. 2C). Excessive vibration (e.g., vibration that exceeds a minimum threshold and/or is not filtered out by the system as noise) may be indicative of an attempt to tamper with and/or remove the mechanical tensioning device, as a change in tension in the security cable 102 based on signals received from a load sensor. If the computing device 500 determines excessive vibration of the mechanical tensioning device 200 based on signal(s) from vibration sensors in optional step 650, computing device 500 may execute one or more security measures (as described in more detail with respect to FIG. 7). In step 660, the computing device 500 may determine whether there has been a change in the tension of security cable 102. When computing device 500 does not detect a change in tension that exceeds a predetermined threshold (e.g., a preset line tension deemed to balance the spring force based on the device and vehicle sizes and configuration), the system may return to step 630 and continue to monitor the tension and optionally monitor for excessive vibrations as discussed with respect to optional steps 640 and 650. In response to detecting a change in tension in security cable 102 that exceeds the predetermined threshold, the system may execute one or more security measures in step 670. In some embodiments, the predetermined threshold for a change in tension may range from extremely little force (e.g., on the order of several ounces of applied tension being sufficient to trigger the security measures) for a higher sensitivity to tampering to a larger force (e.g. on the order of several pounds of applied tension) for a lower sensitivity to tampering, and the predetermined threshold may be selectively adjusted by the end-user (e.g., by adjusting a present line tension).

Figure 7:
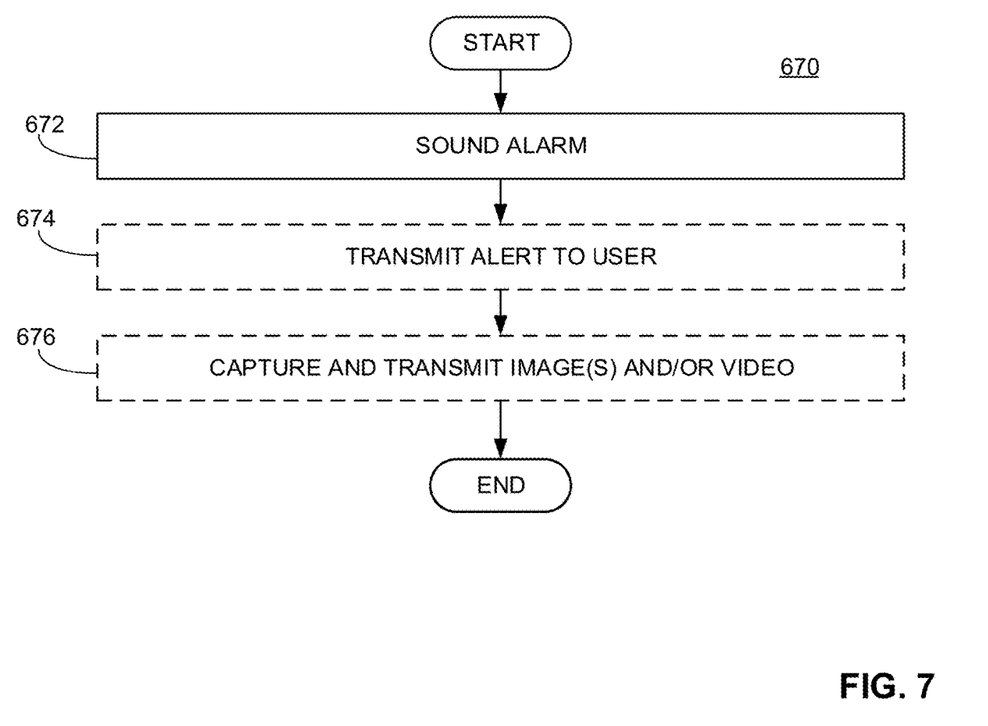
FIG. 7 is a flowchart for an exemplary method for executing one or more security measures.

For example, as shown in more detail in FIG. 7, one security measure from step 670 may include, in step 672, sounding an alarm to be played through a loudspeaker (not shown) or other audio device integrated into mechanical tensioning device 200. In some embodiments, the mechanical tensioning device 200 may be configured to transmit an alert signal to the vehicle 10 in order to activate a native security system associated with the vehicle 10. The alarm may serve to discourage a would-be thief from continued attempts to remove mechanical tensioning device 200 from the vehicle. In optional step 674, the security measures may include transmitting an alert to the user computer device. For example, the alert may be generated by computing device 500 and transmitted using a wireless network, such as a mobile wireless network, to one or more servers associated with the mechanical tensioning device 200. The one or more servers may process the incoming alert signal from the computing device 500, and determine the identity of the end-user based on the information received in the alert signal. The one or more servers may identify an email or phone number associated with the identified end-user and transmit the alert signal to the end user via a SMS message sent to the user's phone number and/or email sent to the end-user associated email address, although any other similar electronic messaging means is contemplated. The alert may include GPS coordinates of computing device 500 to allow the user to quickly recollect where the vehicle has been parked and/or send position data to police or other authorities. The alert may be particularly helpful when the user/vehicle owner is outside of range to hear an audible alarm (e.g., step 672) or does not want the would-be thief to know an alarm has been set off. In addition to alerting the end-user, the computing device 500 may be configured to alert one or more entities including law enforcement and/or a private vehicle security subscription service (e.g., OnStar™ or any similar service). In some embodiments, the computing device 500 may be further configured to transmit instructions to a respective vehicle security subscription service with instructions to disable a vehicle 10 in response to detecting a tampering event (e.g., based on signals received in steps 630 and 640).

In optional step 676, computing device 500 may instruct a camera (not shown) integrated into mechanical tensioning device 200 to capture an image, a series of images, or a video of the person or persons tampering with the mechanical tensioning device 200 and/or vehicle cover 100. These images or videos may be stored locally on computing device 500, and additionally uploaded to one or more servers for secure storage. As part of the alert 674 transmitted to user, or as a separate message, the captured images and/or video may be transmitted to the user (e.g., to user computing device) in optional step 676. In some embodiments, the mechanical tensioning device 200 may include a window of a one-way glass or a clear material to provide a window through which the camera may capture the images, series of images, or video of a potential tampering event. In some embodiments, the camera may be conveniently installed into vehicle 10 separately from the mechanical tensioning device 200. The camera may wirelessly communicate with the computing device 500 using any wireless communication means, but preferably over a Bluetooth™ connection to the computing device 500. When the camera is separately installed into vehicle 10, the camera may be powered by a separate battery configured to power the camera, while in other embodiments, the camera may be configured to be powered by vehicle 10's native electrical system. In order to conserve power, the camera may be configured to enter an active state in response to detecting potential tampering based on the tension and vibration signals from steps 630 and 640, and enter an inactive state to conserve power after the images, series of images, or video has been captured and wirelessly transmitted to computing device 500. After receiving the image, series of images, or video from the camera, the computing device 500 may transmit the images to one or more servers for secure storage.

Figure 8:
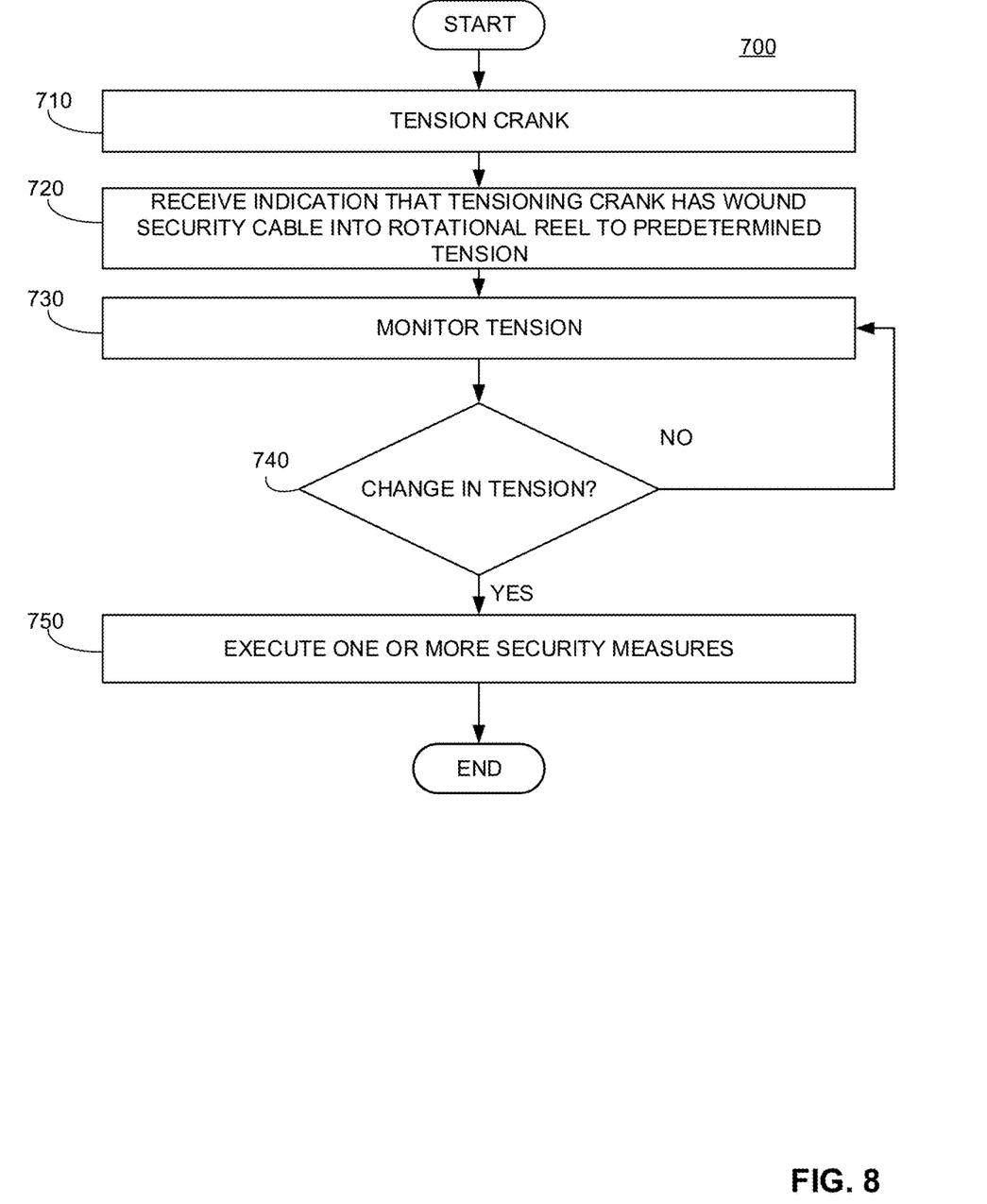
FIG. 8 is a flowchart for another exemplary method of operation of the integrated vehicle cover and security system.

FIG. 8 is a flowchart for another exemplary method of operation 700 of the integrated vehicle cover and security system for use with a semi-automated embodiment of the present disclosure. The semi-automated embodiment may include a manual crank instead of motorized tension motor 208. In step 710, the user may first place the vehicle cover 100 over the vehicle 10 and attach the first end and second end of the security cable 102 to the mechanical tensioning device 200. The user may then tension the crank, which applies rotational force to the rotational reel 204, and wind the security cable 102 partly onto the rotational reel 204. The user may continue to wind the crank until the desired tension is achieved.

In step 720, the user may receive an indication that the tensioning crank has wound the security cable 102 partly into the rotational reel and applied the desired tension to the security cable 102. In some embodiments, a load sensor may monitor the tension applied by the user via the crank, and computing device 500 may generate an indication to the user when the desired tension has been met. For example, the computing device may, via optional display 540, provide an indication to the user when the desired tension has been met, or optionally may generate the indication for display via remote display 542 (e.g., on user computing device, as enabled by network interface 550). In another example, the computing device may provide the indication through a tone generated by the loudspeaker integrated into mechanical tensioning device 200. In a fully manual embodiment lacking computing device 500, mechanical tensioning device may further include a mechanical bi-stable element configured to allow the crank to provide rotational force to the rotational reel 204 until a predetermined tension is met, and afterwards, changing configuration to block the rotational reel from applying additional rotational force to the rotational reel 204. The change in configuration of the bi-stable mechanical element may be accompanied with an audible "click" which may serve as auditory feedback to the user that the desired tension on security cable 102 has been reached. Steps 740 and steps 750 are substantially similar to 660, and 670, respectively, and will be omitted here for brevity.

Example implementations of the disclosed technology may provide an integrated vehicle cover and security system. According to one aspect, the system may include a vehicle cover component including a main panel configured to cover a vehicle when the vehicle is in a used configuration and a bottom edge that surrounds a body of the vehicle when the vehicle cover is in the used configuration. The bottom edge may have a security cable affixed thereto, and the security cable may be integrated into the material of the bottom edge, with the security cable having a first end and second end. The system may include a mechanical tensioning device including a plurality of wheel attachment arms for attaching the mechanical tensioning device to a first wheel of a vehicle. The mechanical tensioning device may additionally include a first cable attachment point and a second cable attachment point, the first cable attachment point for connecting to the first end of the security cable and the second cable attachment point for connecting the second end of the security cable. The mechanical tensioning device may also include at least one rotational reel and at least one tensioning motor in communication with the at least one rotational reel. The tensioning motor may be configured to apply tension to the security cable and the mechanical tensioning device may further include a load sensor configured to monitor the tension placed on the security cable when the mechanical tensioning device is secured to the first wheel, the first end of the security cable is attached to the first cable attachment point, and the second end of the security cable is attached to the second cable attachment point. The system may additional include one or more processors and a memory with instructions configured to cause the cause the system to receive a first signal, transmit a second signal to the at least one tensioning motor, monitor for a change in tension by the load sensor. Responsive to the change in tension, the system may generate one or more security measures and execute the one or more security measures.

In some embodiments, generating the one or more security measures may further include generating an alarm signal and transmitting the alarm signal to a speaker connecting to the processor and integrated into the mechanical tensioning device. In some embodiments, generating the one or more security measures may include generating an alert message and transmitting the alert message to a user device. In some embodiments, the alert may be transmitted by SMS, e-mail, or combinations thereof. In some embodiments, the alert may include the GPS coordinates of the mechanical tensioning device.

In some embodiments, the system may further include a vibration sensing component configured to monitor the mechanical tensioning device for a vibratory acceleration. The vibration sensing component may determine that the vibratory acceleration surpasses a predetermined threshold and, in response, cause the processor to generate the one or more security measures. In some embodiments, the vehicle cover component may further include a material reinforced with Kevlar fibers, metallic fibers, or combinations thereof. In some embodiments, the system may further include an audiovisual recording component and the one or more security measures may further include capturing an image, a series of images in response to detecting the change in tension. In some embodiments, the audiovisual recording component may capture the image, series of images, or video, in response to detecting the change in tension or the vibratory acceleration surpassing the predetermined acceleratory threshold.

In another aspect, an integrated vehicle cover and security system are disclosed. The system may include a vehicle cover component including a main panel configured to cover a vehicle when the vehicle is in a used configuration and a bottom edge that surrounds a body of the vehicle when the vehicle cover is in the used configuration. The bottom edge may have a security cable affixed thereto, and the security cable may be integrated into the material of the bottom edge, with the security cable having a first end and second end. The system may include a mechanical tensioning device including a plurality of wheel attachment arms for attaching the mechanical tensioning device to a first wheel of a vehicle. The mechanical tensioning device may additionally include a first cable attachment point and a second cable attachment point, the first cable attachment point for connecting to the first end of the security cable and the second cable attachment point for connecting the second end of the security cable. The mechanical tensioning device may also include at least one rotational reel and a tensioning crank in communication with the at least one rotational reel. The tensioning crank may be engagedly connected to the at least one rotational reel assembly and configured to rotate the at least one rotational reel to apply tension to the first end and the second end of the security cable. The mechanical tensioning device may further include a load sensor configured to monitor the tension placed on the security cable when the mechanical tensioning device is secured to the first wheel, the first end of the security cable is attached to the first cable attachment point, and the second end of the security cable is attached to the second cable attachment point. The system may additional include one or more processors and a memory with instructions configured to cause the cause the system to monitor for a change in tension by the load sensor. Responsive to the change in tension, the system may generate one or more security measures and execute the one or more security measures.

In another aspect, an integrated vehicle cover and security system is disclosed. The system may include a vehicle cover component including a main panel configured to cover a vehicle when the vehicle is in a used configuration and a bottom edge that surrounds a body of the vehicle when the vehicle cover is in the used configuration. The bottom edge may have a security cable affixed thereto, and the security cable may be integrated into the material of the bottom edge, with the security cable having a first end and second end. The system may include a mechanical tensioning device including a plurality of wheel attachment arms for attaching the mechanical tensioning device to a first wheel of a vehicle. The mechanical tensioning device may additionally include a first cable attachment point and a second cable attachment point, the first cable attachment point for connecting to the first end of the security cable and the second cable attachment point for connecting the second end of the security cable. The mechanical tensioning device may also include at least one rotational reel and a tensioning crank in communication with the at least one rotational reel. The tensioning crank may be engagedly connected to the at least one rotational reel assembly and configured to rotate the at least one rotational reel to apply tension to the first end and the second end of the security cable. The system may additional include a mechanical bi-stable device configured to provide an indication when the tensioning crank has applied a predetermined tension to the first end and the second end of the security cable.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An integrated vehicle cover and security system, the system comprising:
    a vehicle cover comprising a main cover panel, a bottom edge, and a security cable, the main cover panel being configured to at least partially cover a body of a vehicle with the bottom edge surrounding the body of the vehicle when the vehicle cover is in an in-use configuration, the security cable being at least partially integrated into a fabric of the bottom edge and having a first end and a second end;
    a mechanical tensioning device configured to attach to a first wheel of the vehicle comprising:
        a first cable attachment point located proximate a front end of the first wheel;
        a second cable attachment point located proximate a back end of the first wheel;
        at least one rotational reel assembly connected to the first and second cable attachment points;
        at least one tensioning motor in communication with the at least one rotational reel assembly, configured to apply tension to the first end and the second end of the security cable; and
        a load sensor configured to monitor the tension placed on the security cable when the vehicle cover is in the in-use configuration;
    one or more processors in communication with the mechanical tensioning device; and
    a memory in communication with the one or more processors and storing instructions, that when executed by the one or more processors, are configured to cause the system to:
        transmit a first signal to the at least one tensioning motor to tension the security cable to a predetermined tension;
        monitor for a change in tension by the load sensor;
        responsive to detecting the change in tension, generate one or more security measures; and
        execute the one or more security measures.

2. The system of claim 1, wherein the at least one tensioning motor is coupled to at least one driving gear and the at least one driving gear is coupled to the at least one rotational reel assembly.

3. The system of claim 1, wherein the load sensor comprises a limit switch in communication with the at least one rotational reel assembly, the load sensor having a tension adjustment screw configured to adjust the predetermined tension of the security cable.

4. The system of claim 1, wherein the load sensor comprises a load cell configured to continuously monitor for the change in tension of the security cable.

5. The system of claim 1, wherein the mechanical tensioning device further comprises a housing containing at least the load sensor, the at least one rotational reel assembly, and the at least one tensioning motor, wherein an interior portion of the housing is not accessible when the mechanical tensioning device is in an in-use configuration.

6. The system of claim 1, further comprising a vibration sensing component configured to:
    monitor the mechanical tensioning device for a vibratory acceleration;
    determine that the vibratory acceleration surpasses a predetermined acceleratory threshold; and
    responsive to the vibratory acceleration surpassing the predetermined acceleratory threshold, cause the processor to generate the one or more security measures.

7. The system of claim 1, further comprising a wireless communication device comprising a transponder encoded with an electronic key matching an electronic key of the one or more processors in communication with the mechanical tensioning device, the wireless communication device configured to:
    transmit a signal to the one or more processors configured to put the mechanical tensioning device into one of an active state or an inactive state.

8. The system of claim 1, wherein each of the first cable attachment point and the second cable attachment point further comprise a male key configured to detachably connect to one of the first end of the security cable or the second end of the security cable, each of the first end of the security cable and the second end of the security cable further comprising a female key configured to receive a respective male key of either the first cable attachment point or the second cable attachment point.

9. The system of claim 6, further comprising an audiovisual recording component, wherein the one or more security measures further comprise capturing an image, a series of images, or a video responsive to (i) detecting the change in tension or (ii) the vibratory acceleration surpassing the predetermined acceleratory threshold.

10. An integrated machine cover and security system, the system comprising:
a cover comprising a security cable and a main cover panel configured to at least partially cover a machine when the cover is in an in-use configuration, at least a portion of the security cable being housed within a lower chamber of the main cover panel, the lower chamber being configured to surround a body of the machine when the cover is in the in-use configuration, and the security cable having a first end and a second end;
a mechanical tensioning device configured to attach to a first wheel of the machine comprising:
one or more wheel attachment arms for attaching the mechanical tensioning device to a first wheel of the machine;
a first cable attachment point located proximate a front end of the first wheel;
a second cable attachment point located proximate a back end of the first wheel;
at least one rotational reel assembly connected to the first and second cable attachment points;
a tensioning crank configured to rotate the at least one rotational reel to apply tension to the first end and the second end of the security cable; and
a load sensor configured to monitor the tension placed on the security cable when the vehicle cover is in the in-use configuration;
one or more processors in communication with the mechanical tensioning device; and
a memory in communication with the one or more processors and storing instructions, that when executed by the one or more processors, are configured to cause the system to:
receive, from the load sensor, an indication that the tensioning crank has caused the security cable to be tensioned to a predetermined tension;
monitor for a change in tension by the load sensor;
responsive to detecting the change in tension, generate one or more security measures; and
execute the one or more security measures.

11. The system of claim 10, wherein the load sensor comprises a limit switch in communication with the at least one rotational reel assembly, the load sensor having a tension adjustment screw configured to adjust the predetermined tension of the security cable.

12. The system of claim 10, wherein the load sensor comprises a load cell configured to continuously monitor for the change in tension of the security cable.

13. The system of claim 10, wherein the mechanical tensioning device further comprises a housing containing at least the load sensor, the at least one rotational reel assembly, and the at least one tensioning motor, wherein an interior portion of the housing is not accessible when the mechanical tensioning device is in an in-use configuration.

14. The system of claim 10, further comprising a wireless communication device comprising a transponder encoded with an electronic key matching an electronic key of the one or more processors in communication with the mechanical tensioning device, the wireless communication device configured to:
transmit a signal to the one or more processors configured to put the mechanical tensioning device into one of an active state or an inactive state.

15. The system of claim 10, further comprising a vibration sensing component configured to:
monitor the mechanical tensioning device for a vibratory acceleration;
determine that the vibratory acceleration surpasses a predetermined acceleratory threshold; and
responsive to the vibratory acceleration surpassing the predetermined acceleratory threshold, cause the processor to generate the one or more security measures.

16. The system of claim 10, wherein each of the first cable attachment point and the second cable attachment point further comprise a male key configured to detachably connect to one of the first end of the security cable or the second end of the security cable, each of the first end of the security cable and the second end of the security cable further comprising a female key configured to receive a respective male key of either the first cable attachment point or the second cable attachment point.

17. The system of claim 10, further comprising an audiovisual recording component, wherein the one or more security measures further comprise capturing an image, a series of images, or a video responsive to detecting the change in tension.

18. An integrated machine cover and security system, the system comprising:
a cover comprising a security cable and a main cover panel configured to cover at least an upper portion of a machine when the cover is in an in-use configuration, the main cover panel having a bottom edge that surrounds a body of the machine when the cover is in the in-use configuration, the bottom edge being attachable to the security cable; and
a mechanical tensioning device configured to attach to a first wheel of the machine comprising:
a first cable attachment point located proximate a front end of the first wheel;
a second cable attachment point located proximate a back end of the first wheel;
at least one rotational reel assembly connected to the first and second cable attachment points;
a tensioning crank configured to rotate the at least one rotational reel to apply tension to the security cable; and
a mechanical bi-stable device configured to provide an indication when the tensioning crank has applied a predetermined tension to the security cable.

19. The system of claim 18, further comprising a locking mechanism configured to prevent the tensioning crank from rotating the at least one rotational reel when the locking mechanism is engaged to the tensioning crank.

20. The system of claim 19, wherein the mechanical tensioning device further comprises a housing containing at least the mechanical bi-stable device, the at least one rotational reel assembly, and the locking mechanism, wherein an interior portion of the housing is not accessible when the mechanical tensioning device is in an in-use configuration.

* * * * *